(12) United States Patent
Evanitsky et al.

(10) Patent No.: US 8,855,561 B2
(45) Date of Patent: Oct. 7, 2014

(54) DEVICE DATA COLLECTION USING BLUETOOTH

(75) Inventors: Eugene S. Evanitsky, Pittsford, NY (US); Jeffrey R. Earl, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 220 days.

(21) Appl. No.: 13/171,249

(22) Filed: Jun. 28, 2011

(65) Prior Publication Data
US 2013/0005254 A1 Jan. 3, 2013

(51) Int. Cl.
*H04B 7/00* (2006.01)
*H04W 8/24* (2009.01)
*H04W 84/12* (2009.01)

(52) U.S. Cl.
CPC ............... *H04W 8/24* (2013.01); *H04W 84/12* (2013.01)
USPC ....... 455/41.2; 455/557; 455/566; 455/414.3; 455/410; 455/415; 455/418; 455/405; 455/406; 358/1.15; 358/1.16; 358/1.13; 358/400; 358/403; 715/733; 715/735; 715/707; 715/744; 715/745

(58) Field of Classification Search
USPC ............. 455/41.2, 557, 566, 414.3, 410, 415, 455/418; 358/1.15, 400, 1.13, 1.16; 715/733, 735, 707, 713, 744, 745, 762, 715/763, 810–867
See application file for complete search history.

(56) References Cited

U.S. PATENT DOCUMENTS

| | | | |
|---|---|---|---|
| 7,933,033 B2 * | 4/2011 | Ohishi et al. | 358/1.15 |
| 8,107,117 B2 * | 1/2012 | Harada et al. | 358/1.16 |
| 2002/0067497 A1 * | 6/2002 | Thieret et al. | 358/1.13 |
| 2003/0137682 A1 * | 7/2003 | Sakai et al. | 358/1.13 |
| 2007/0252857 A1 * | 11/2007 | Watase | 347/5 |
| 2009/0064146 A1 * | 3/2009 | Kono et al. | 718/100 |
| 2011/0081949 A1 * | 4/2011 | Natarajan et al. | 455/557 |
| 2011/0287814 A1 * | 11/2011 | Lee et al. | 455/566 |
| 2012/0105905 A1 * | 5/2012 | Wei et al. | 358/1.15 |

* cited by examiner

*Primary Examiner* — Ganiyu A Hanidu
(74) *Attorney, Agent, or Firm* — MH2 Technology Law Group LLP

(57) ABSTRACT

In accordance with aspects of the present disclosure, a method is described that includes establishing a wireless communication link between a mobile device and a document processing device; transmitting, by a transmitter of the document processing device, data stored in a memory of the document processing device related to the functionality of the document processing device to the mobile device; and receiving, by a receiver of the document processing device, data to control a functionality of the document processing device from the mobile device.

10 Claims, 2 Drawing Sheets

DEVICE DATA COLLECTION USING BLUETOOTH

FIELD OF THE DISCLOSURE

The present application relates to wireless communication mechanism to support one or more remotely located document processing devices.

BACKGROUND OF THE DISCLOSURE

Document processing devices, such a multifunction printer, copies, scanners and fax machines are common in an office or an organization environment. Typically, these document processing devices are remotely located at a customer or end-user locations and require periodic maintenance and inspection. In these devices, various types of consumables, such as toner or paper, and mechanical systems need to be replaced or maintained for the device to function properly. In many cases, these devices are not connected to a network or information is not permitted to leave the customer's domain. Technical representatives can be used to collect the data using, for example, a USB memory stick or a disc, related to the usage of the device; however, this can be a costly procedure. Alternatively or additionally, customers can manually collect the data as well but this is unreliable, error prone and time consuming and costly to them.

What is needed is a improved mechanism with which data can be collected and services can be performed on one or more document processing devices.

SUMMARY OF THE DISCLOSURE

In accordance with aspects of the disclosure, a method is described that includes establishing a wireless communication link between a mobile device and a document processing device; transmitting, by a transmitter of the document processing device, data stored in a memory of the document processing device related to the functionality of the document processing device to the mobile device; and receiving, by a receiver of the document processing device, data to control a functionality of the document processing device from the mobile device.

In some aspects, the wireless communication link is arranged to communicate using a wireless protocol including, for example, Bluetooth protocol, WiFi or WiMAX.

In some aspects, the transmitted data can include, for example, financial-related data, replenishment-related data and/or maintenance-related data. The received data can include, for example, data related to cloning a document processing device to a common configuration or data related to loading new software to the document processing device.

In some aspects, the receiving and transmitting data can occur when the mobile device is in a vicinity of the document processing device for a predetermined time period.

In some aspects, the transmitted data can be received using a mobile device application loaded on the mobile device.

In some aspects, the transmitted data received at the mobile device can include an identification of the document processing device.

In some aspects, the transmitted data can include information related to a previous time at which data was transmitted.

In some aspects, the transmitted data can be encoded or encrypted.

In accordance with some aspects of the present disclosure, a document processing device is disclosed that includes a transmitter arranged to transmit data stored in a memory of the document processing device related to the functionality of the document processing device to a mobile device over a wireless communications link; and a receiver arranged to receive data to control a functionality of the document processing device from the mobile device over the wireless communications link.

In some aspects, the wireless communication link is arranged to communicate using a wireless protocol including, for example, Bluetooth protocol, WiFi and WiMAX.

In some aspects, the transmitted data can include data related to, for example, financial-related data, replenishment-related data and/or maintenance-related data. The received data can include data related to, for example, cloning a document processing device to a common configuration or loading new software to the document processing device.

In some aspects, the receiving and transmitting data can occur when the mobile device is in a vicinity of the document processing device for a predetermined time period.

In accordance with some aspects of the present disclosure, a method is disclosed that includes connecting with an Bluetooth-enabled document processing device; checking if data from the document processing device has been received within a predetermined time period; sending a request for data related to billing and/or supplies from the document processing device if the check has determined that the predetermined time period has exceed a predetermined time check threshold; and aggregating data from the document processing device and other document processing devices.

In some aspects, the method can also include transmitting the data to a fulfillment center and/or connecting with a computer to transmit the data to a fulfillment center.

In accordance with some aspects of the present disclosure, a method is disclosed that includes receiving data, at a mobile device, from a transmitter of a document processing device using a wireless communication protocol; storing the data in a storage module of the mobile device; and transmitting the data to a service center.

In the method, the wireless communication protocol can include, for example, Bluetooth protocol, WiFi and WiMAX. The data transmitted between the mobile device and the document processing device can include, for example, financial-related data, replenishment-related data, maintenance-related data and combinations thereof. The document processing device can include any type of office device connect or not connected to a network. The data can be transmitted bi-directionally between the mobile device and the document processing device received when a user equipped with the mobile device is in a vicinity of the document processing device for a predetermined time period. The data transmission can be performed continuously or during a predetermined time intervals. The data can be received using a mobile device application loaded on the mobile device. The data received at the mobile device can include an identification of the document processing device. The data received at the mobile device can include information related to a previous time at which data was transmitted. The data that can be transmitted to the document processing device can include, for example, data that is used to clone machines to a common configuration or can be used to load new software to the document processing device. For example, the mobile device can copy all set up information for one machine and transmit that information to other machine to so that the machine share a common setup and configuration.

In some aspects of the present disclosure, the data that is transmitted to the mobile device can be encoded or encrypted. The method can include decoding or decrypting the data using a key stored in the mobile device, wherein the key is stored in the storage module or another storage module.

In some aspects of the present disclosure, the data received may not require a user action.

In some aspects of the present disclosure, the method can include transmitting an acknowledgement to the data processing device that the data was received at the mobile device. The method can also include comparing a time stamp from the received data with another time stamp for data received by the data processing device at another time. The method can also include not storing the data is the time stamp indicates a time period that is below a predetermined time period threshold. The method can also include transmitting a message to the data processing device that the data has not been stored.

In some aspects of the present disclosure, a method is described that can include collecting data from one or more sub-modules of a data processing device; storing the data at a storage module; transmitting the data from a transmitter of the document processing device using a wireless communication protocol to a mobile device; and receiving an acknowledgement that the transmitted data was received at the mobile device.

In some aspects in the method, the wireless communication protocol can include, for example, Bluetooth protocol, WiFi and WiMAX. The data can include for example, financial-related data, replenishment-related data, maintenance-related data and combinations thereof.

In some aspects of the present disclosure, data transmission can occur when a user device is in a vicinity of the document processing device for a predetermined time period. In some aspects, the data transmission can be performed if the user or mobile device is within a transmitting vicinity and authenticated with the document processing device for a predetermined time interval. The data can be transmitted to a mobile device application loaded on the mobile device. The data can be transmitted to the mobile device includes an identification of the document processing device. The data can be transmitted to the mobile device can include information related to a previous time at which data was transmitted. The data can be encoded or encrypted before transmission to the mobile device. The encoded or encrypted data can be arranged to be decoded or decrypted using a key stored in the mobile device. The transmission of the data may not require a user action. The data can be transmitted with a time stamp.

In accordance with some aspects of the present disclosure, a method is described that includes connecting with an Bluetooth-enabled document processing device; checking if data from the document processing device has been received within a predetermined time period; sending a request for data related to billing and/or supplies from the document processing device if the check has determined that the predetermined time period has exceed a predetermined time check threshold; and aggregating data from the document processing device and other document processing devices.

The method can also include transmitting the data to a service center, for example any back office system including, but not limited to, a fulfillment center, a billing center, a supplies replenishment center, a help center or connecting with a computer to transmit the data to various back office systems.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

DESCRIPTION OF THE EMBODIMENTS

Reference will now be made in detail to various exemplary embodiments of the present application, examples of which are illustrated in the accompanying drawings. Wherever possible, the same reference numbers will be used throughout the drawings to refer to the same or like parts.

Business entities that support document processing devices that are remotely deployed or on-site of a customer's premise often need information that is stored within these documents processing devices in order to support billing, supplies replenishment and remote repair. In certain instances, document processing devices may not be connected to a network or if they are connected are not permitted to transmit certain data over the network. In some aspects of the present disclosure, the document processing devices can be equipped with short range wireless technology to facilitate the collection of data stored within the devices related to billing, supplies replenishment and remote repair. The short range wireless technology can include technologies such as Bluetooth, WiFi, WiMAX or other suitable wireless technology. The document processing devices can include a wireless transceiver that can be configured to communicate with a similarly configured or paired transceiver to collect this data. The similarly configured or paired transceiver can be arranged within a mobile wireless device, such a smartphone like those marketed by Apple or Google. An application can be used on the smartphone to allow the collection of this data as well as to provide user-interface for the user of the mobile device.

Figure 1:
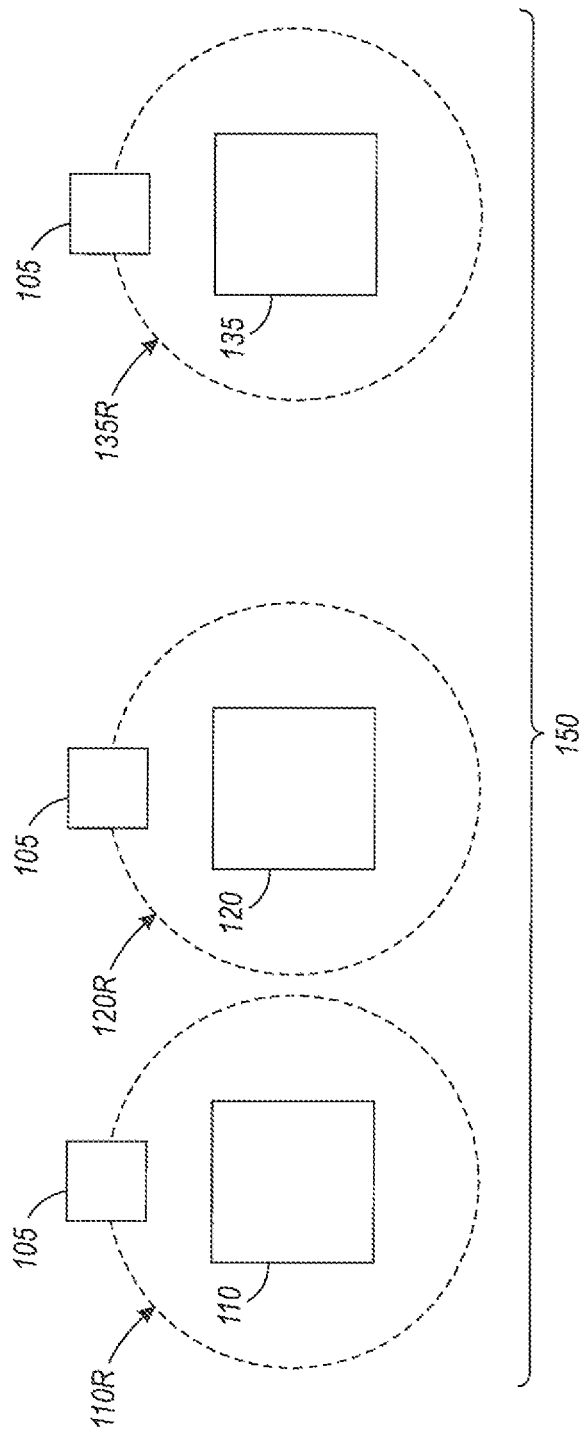
FIG. 1 shows an example system diagram in accordance with aspects of the present disclosure.

FIG. 1 shows an example usage scenario in accordance with some aspects of the present disclosure. In order for devices to communicate with the short range wireless technology, an initial registration or pairing process must occur to establish a working relationship among devices. This registration or pairing process may differ depending on the particular type of wireless technology used and is well known to those of skilled in the relevant art. In some aspects of the present disclosure, the mobile device and/or the document processing device may transmit an identifier and/or a time stamp each time communication is established or data is transmitted. The time stamp transmitted by the document processing device can be used by the mobile device to determine if data received should be processed or rejected based on a time of a previous transmission. For example, if a current transmission time, as determined by the timestamp, is within a predefined time period based on the previous data transmission, mobile device may reject the transmission since the data would most likely overlap with data already received.

A user equipped with mobile device 105 approaches within an operating vicinity of document processing device 110.

Dotted circles 110R, 120R and 135R represents the maximum extent of the short range wireless technology, such as Bluetooth, supported by devices 110, 120 and 135, respectively. When user device 105 enters the operating vicinity of device 110, a connection is established that allows data to be exchanged between the devices. When user device 105 enters the operating vicinity of device 120, a similar connection is established to allow data exchange. In some circumstances, device 105 may be located within overlapping vicinity of devices 110 and 120 and able to communicate with both devices 110 and 120. In this overlapping case, duplicate data can be collected and filtered on the receiving end or the mobile device 145 may receive a message indicating that data has already been collected. As the device 105 moves out of range of devices 110 and 120 and enter operating vicinity 140, device 105 can then establish communication with device 135. In some circumstances, another user with mobile device 145 may not be within the operating vicinity of either devices 110, 120 or 135, and as such, would not be able to establish communication with those devices. So as a user with a registered or paired device 105 movies within a facility containing devices 110, 120 and 135 and within each devices 110, 120 and 135 operating vicinity, mobile device 105 can collect data from each device 110, 120 and 135 that can be used to support billing, supplies replenishment and remote repair.

Mobile device 105 can then transmit the data collected from one or more document processing devices to service center 150 for processing. Mobile device 105 may transmit data to center 150 continuously or in a batch transmission after the completion of a shift, completion of a work day or weekly, depending on the particular requirements of either the customer or fulfillment center 150. Mobile device 105 may directly transmit the data to center 150 using the various wireless technologies on the device 105 or the user may synch device 105 with another computer, which can then transmit the data to center 150.

Figure 2:
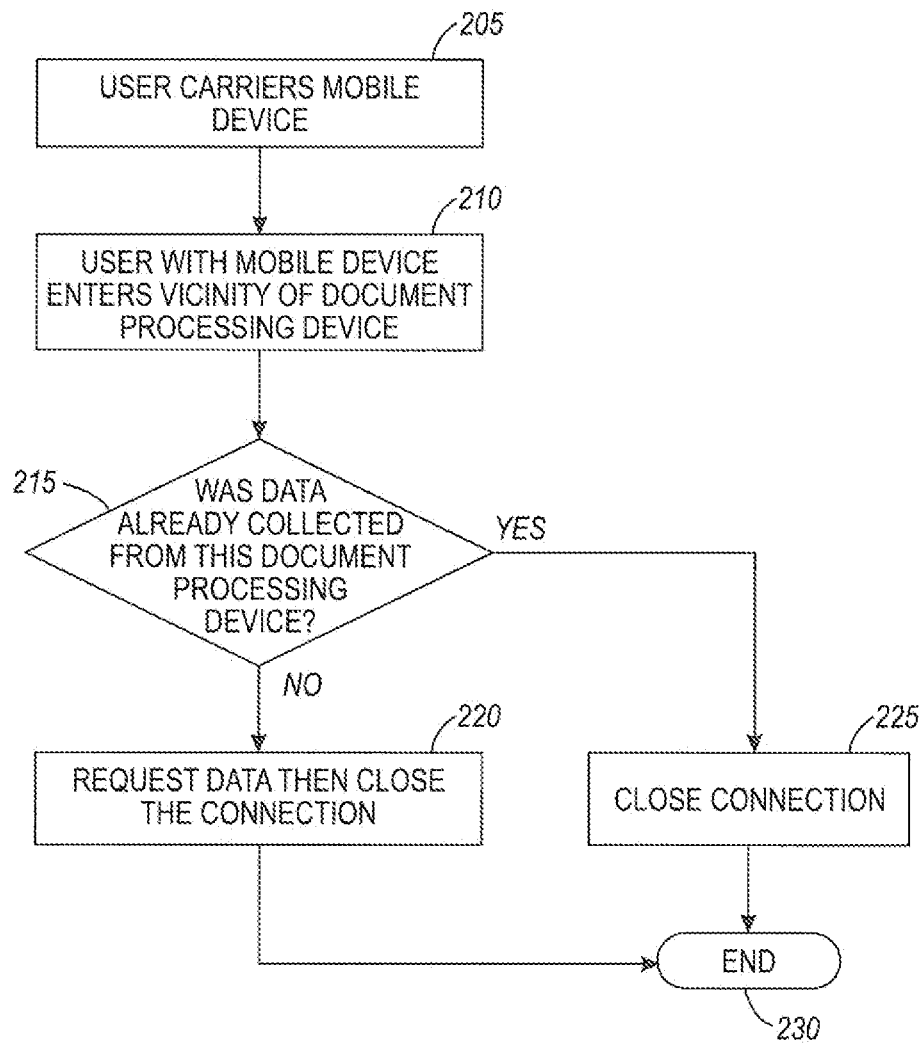
FIG. 2 shows an example process flow in accordance with aspects of the present disclosure.

FIG. 2 shows an example process for data management in accordance with aspects of the present disclosure. At 205, a user carries a mobile device with the application around their work place as part of their normal daily activities. At 110, the user walk past a document processing device that is equipped with short range wireless technology, where the mobile device and the document processing device have been registered or paired with other to communicate data. At 215, a determination is made as to whether data was already collected from this machine. This determination can be made by checking to see whether an identification of the document processing device is stored in a memory of the mobile device and determining when that particular document processing device transmitted data to the mobile device based on a time reference, such as a time stamp associated data transmitted with the identification of the document processing devices. If the determination at 215 is affirmative, then the connection is closed at 225 and the process ends at 230. If the determination at 215 is negative, then a data request is made and then the connection is closed at 220 and the process ends at 230.

In some aspects of the present disclosure, data can also be pushed to the document processing devices from the mobile device. This data can be used to configure the document processing device, set URLs, or to do simple software uploads, such as patches. In the latter case, an application on the mobile device could be used to upload the data and serial numbers and then perform the download when a connection with the mobile device is made.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, ° fit may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, in describing representative embodiments of the present disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequence may be varied and still remain within the spirit and scope of the present disclosure.

Any of the functions described as being performed by a module, component or system can in some embodiments be performed by one or more other modules, component or system. One or more functions described as being performed by different modules, components or systems can be combined to be performed by one or more common module, component or system.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other; and/or that the two or more elements co-operate or interact with each other (e.g. as in a cause an effect relationship).

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method comprising:
    establishing a wireless communication link between a mobile device and a document processing device;
    determining that data collected and stored in a memory of the document processing device related to the functionality of the document processing device based on a time reference of a particular document has not been transmitted to the mobile device in a predetermined time period;
    transmitting, by a transmitter of the document processing device, the data stored in the memory of the document processing device related to the functionality of the document processing device to the mobile device based on the predetermined time period that was determined, wherein the data comprises one or more of financial-related data, replenishment-related data, and maintenance-related data; and
    receiving, by a receiver of the document processing device, data to control a functionality of the document processing device from the mobile device,
    wherein the receiving and transmitting data occurs when the mobile device is in a vicinity of the document processing device for a predetermined time period,
    wherein the received data includes data to clone a document processing device to a common configuration or load new software to the document processing device.

2. The method according to claim 1, wherein the wireless communication link is arranged to communicate using a protocol selected from the group consisting of Bluetooth protocol, WiFi and WiMAX.

3. The method according to claim 1, wherein the transmitted data is received using a mobile device application loaded on the mobile device.

4. The method according to claim 1, wherein the transmitted data received at the mobile device includes an identification of the document processing device.

5. The method according to claim 1, wherein the transmitted data includes information related to a previous time at which data was transmitted.

6. The method according to claim 1, wherein the transmitted data is encoded or encrypted.

7. A document processing device comprising:
    a processor coupled to a memory and configured to determine that data collected and stored in a memory of the document processing device related to the functionality of the document processing device based on a time reference of a particular document has not been transmitted to a mobile device in a predetermined time period;
    a transmitter arranged to transmit the data stored in the memory of the document processing device related to the functionality of the document processing device to a mobile device over a wireless communications link based on the predetermined time period that was determined, wherein the data comprises one or more of financial-related data, replenishment-related data, and maintenance-related data; and
    a receiver arranged to receive data to control a functionality of the document processing device from the mobile device over the wireless communications link,
    wherein the receiving and transmitting data occurs when the mobile device is in a vicinity of the document processing device for a predetermined time period,
    wherein the received data includes data to clone a document processing device to a common configuration or load new software to the document processing device.

8. The device according to claim 7, wherein the wireless communication link is arranged to communicate using a protocol selected from the group consisting of Bluetooth protocol, WiFi and WiMAX.

9. A method comprising:
    connecting, by a computing device, with an Bluetooth-enabled document processing device;

determining by an application executing on the computing device, that data collected from the document processing device based on a time reference of a particular document has not been received by the computing device within a predetermined time period, wherein the data comprises financial-related data, replenishment-related data, and maintenance-related data;

sending a request for the data to the document processing device based on the determining if the check has determined that the predetermined time period has exceed a predetermined time check threshold, wherein the data comprises financial receiving the data provided by the document processing device;

aggregating the data from the document processing device and other document processing devices;

transmitting the data to a fulfillment center; and transmitting control functionality data to the document processing device, wherein the control functionality data comprises data to clone a document processing device to a common configuration or load new software to the document processing device.

10. The method according to claim 9, further comprising connecting with a computer to transmit the data to a fulfillment center.

* * * * *